United States Patent
Sengoku

(10) Patent No.: US 7,496,765 B2
(45) Date of Patent: Feb. 24, 2009

(54) SYSTEM, METHOD AND PROGRAM PRODUCT TO PREVENT UNAUTHORIZED ACCESS TO PORTABLE MEMORY OR STORAGE DEVICE

(75) Inventor: Yasuhiko Sengoku, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 799 days.

(21) Appl. No.: 11/081,066

(22) Filed: Mar. 15, 2005

(65) Prior Publication Data
US 2005/0206353 A1 Sep. 22, 2005

(30) Foreign Application Priority Data
Mar. 22, 2004 (JP) ............................. 2004-082674

(51) Int. Cl.
*H04L 9/32* (2006.01)
(52) U.S. Cl. ...................... 713/189; 713/192; 713/193; 726/27
(58) Field of Classification Search ................ 726/2–3, 726/27–30, 34; 713/192–194, 189
See application file for complete search history.

(56) References Cited

U.S. PATENT DOCUMENTS 5,371,793 A * 12/1994 Kimura ...................... 713/193
7,013,481 B1 * 3/2006 Ellison et al. .................. 726/4
2003/0217151 A1 11/2003 Roese et al. ................. 709/225

FOREIGN PATENT DOCUMENTS

| JP | 01-226314 | 9/1989 |
|---|---|---|
| JP | 06-020114 | 1/1994 |
| JP | 2002-175355 | 6/2002 |
| JP | 2002-216099 | 8/2002 |

OTHER PUBLICATIONS

Information Materials for IDS from our Japanese IP Law department.

* cited by examiner

*Primary Examiner*—Hosuk Song
(74) *Attorney, Agent, or Firm*—Arthur J. Samodovitz; Shimokajl & Associates, PC

(57) ABSTRACT

System, method and program product for protecting access to a portable memory or storage device. There can be detection if the portable memory or storage device is more than a predetermined distance from a reference location. If so, access to a portion or all of data within the portable memory or storage device is automatically prevented. The reference location can be the location of a computing apparatus which is authorized to access the portable memory or storage device. Also, there can be detection of lapse of a predetermined time the portable memory or storage device has been unable to communicate with a predetermined computing apparatus. In response, access to a portion or all of data stored on the portable memory or storage device is prevented. Also, there can be detection of lapse of a predetermined time since the portable memory or storage device has been accessed by an information processing apparatus in which the device is installed. In response, access to a portion or all of data stored on the portable memory or storage device is prevented.

10 Claims, 8 Drawing Sheets

SYSTEM, METHOD AND PROGRAM PRODUCT TO PREVENT UNAUTHORIZED ACCESS TO PORTABLE MEMORY OR STORAGE DEVICE

BACKGROUND

The present invention relates generally to portable memory and storage devices, and more particularly to a technique to prevent unauthorized access to data on a portable memory or storage device when the portable memory or storage device is removed from an intended information processing device.

Portable memory and storage devices, such as USB memories, PCMCIA memory cards and SD memory cards, are used for transporting or transferring data between computing devices. The portability results from simple detachment from or attachment to suitable computing devices, either by a physical attachment or wireless connection. Because these memory and storage devices are portable, they can be lost or stolen. Consequently, they can fall into the hands of an unintended third party. Therefore, it is desirable to prevent unauthorized access to data on the portable memory or storage device when the portable memory or storage device is removed from an intended information processing device.

In known USB memories, part or all of the memory or storage area is classified as a security area which only an authorized user can access with a proper password. See "PC peripherals: Options by IBM 256 MB USB 2.0 Memory Key" (IBM Japan, Internet URL: http://www-6.ibm.com/jp/pc/option/obi/nob03/22p9025/22p9025a.html, available on Feb. 26, 2004). This document describes a portable memory or storage device where a user must be authenticated through a password before the user can read data stored in a security area. This protects the data from unauthorized access. However, password authentication requires authentication each time the portable memory or storage device is plugged into another information processing apparatus. For example, if the user wants to provide data from his or her personal computer (PC) to another person's PC, the user attaches the portable memory or storage device to his or her PC, writes data on it, detaches the portable memory or storage device from his or her PC, then attaches the portable memory or storage device to the other person's PC, and then must undergo authentication before reading the data on that person's PC. Moreover, because the user enters his or her password on the other person's PC to permit access by this other person, the password may be seen by the other person.

An object of the present invention is to protect a portable memory or storage device from unauthorized access. A more specific object of the present invention is to protect a portable memory or storage device from unauthorized access, in a convenient manner.

SUMMARY OF THE INVENTION

The invention resides in a system, method and program product for protecting access to a portable memory or storage device. There is detection if the portable memory or storage device is more than a predetermined distance from a reference location. If so, access to a portion or all of data within the portable memory or storage device is automatically prevented. The reference location can be the location of a computing apparatus which is authorized to access the portable memory or storage device.

The invention also resides in a system, method and program product for protecting access to a portable memory or storage device. There is detection of lapse of a predetermined time the portable memory or storage device has been unable to communicate with a predetermined computing apparatus. In response, access to a portion or all of data stored on the portable memory or storage device is prevented.

The invention also resides in a system, method and program product for protecting access to a portable memory or storage device. There is detection of lapse of a predetermined time since the portable memory or storage device has been accessed by an information processing apparatus in which the device is installed. In response, access to a portion or all of data stored on the portable memory or storage device is prevented.

The invention also resides in a system, method and program product for protecting access to a portable memory or storage device. A connection interface of the portable memory or storage device is covered with a protective cover while removed from an information processing apparatus. The memory or storage device with the cover will not fit into the information storage apparatus. The memory or storage device is installed into an information storage apparatus without the cover. Subsequently, it is detected that the cover has been removed for a preset time. In response, access to a portion or all of the data on the memory or storage device is prevented.

According to features of the present invention, the access prevention can be prevention or reading or writing to the data, deletion of the data and/or encryption of the data.

DETAILED DESCRIPTION OF THE PREFERRED EMBODIMENTS

Figure 1:
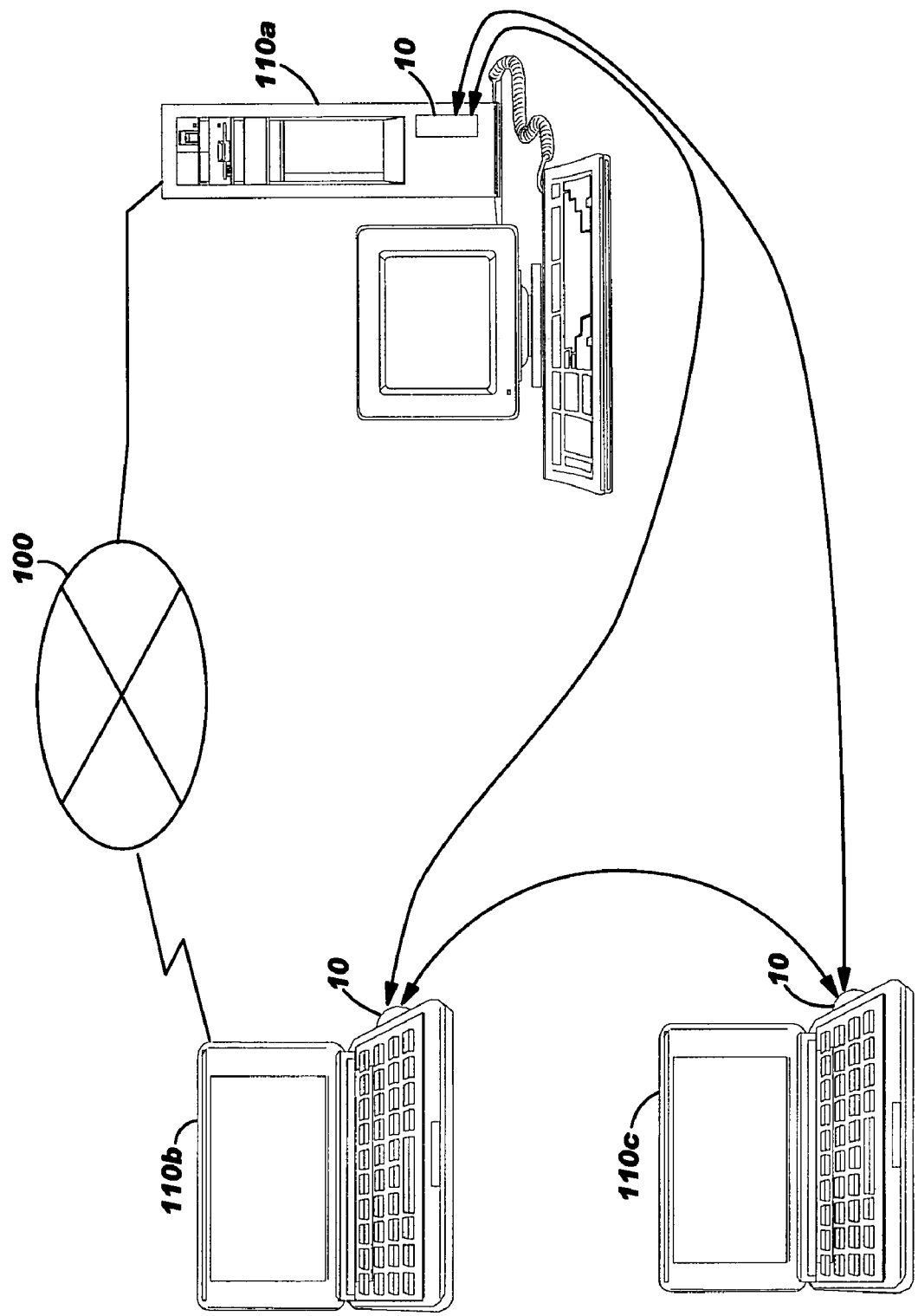
FIG. 1 shows an exemplary environment which includes a portable memory or storage device according to an embodiment of the present invention.

FIG. 1 shows an example of a computer environment which includes a portable memory or storage device 10 according to the present invention. The portable memory or storage device 10 is used for transporting or transferring data between the user's own information processing devices 11*a* and 11*b* or between the user's information processing apparatus 110*a* or 110*b* and another person's information processing apparatus 110*c*.

The portable memory or storage device 10 is removable or detachable from and installable in or attachable to any of the information processing apparatus 110*a,b* or *c*. The attachment can be physical or wireless. When a physical connection is used, the user inserts the device 10 in an apparatus 110*a,b* or *c*, writes data onto device 10, and subsequently removes the device 10 from apparatus 110*a,b* or *c*, transports device 10 to another information processing apparatus, inserts the device 10 into this other information processing apparatus and then accesses the data from this other information processing apparatus. When a wireless connection is used, the portable memory or storage device 10 may transmit and receive data wirelessly to and from any information processing apparatus 110a,b or c at close range, without being physically attached to the information processing apparatus 110a,b or c.

The information processing apparatuses 110a, 110b and 110c may be desktop or laptop PCs, PDAs (Personal Data Assistant), mobile phones, digital cameras, or digital video cameras that transmit and receive data to and from the portable memory or storage device 10. In the illustrated example, information processing apparatus 11a is stationary such as a desktop PC, which may be located at the home or office of the user, and information processing apparatus 110b and 110c are a mobile information processing apparatus such as a laptop/notebook PC or PDA.

A network 100 is a communication network such as the Internet that connects with information processing apparatus 110a through a cable communication network link and also connects with information processing apparatus 110b through a wireless communication network link.

Before traveling, the user can write data from information processing apparatus 110a to the portable memory or storage device 10, remove the device 10 from apparatus 110a, then connect the portable memory or storage device 10 to information processing apparatus 110b, and then carry information processing apparatus 110b to another location. Then, at the other location, the user apparatus 110b can write data to the portable memory or storage device 10 and then detach the portable memory or storage device 10 from apparatus 110b, and then install device 10 in information processing apparatus 110c to provide the data on device 10 to another person who owns apparatus 110c. The owner of apparatus 110c can also write data from information processing apparatus 110c to the portable memory or storage device 10, remove device 10 from apparatus 110c and then transport the portable memory or storage device 10 to information processing apparatus 110b and attach device 10 to apparatus 110b to convey data to the owner of apparatus 110b. The portable memory or storage device 10 may also be used to exchange data between information processing apparatuses 110a and 110c in the same way as between information processing apparatuses 110b and 110c.

The data on device 10 may be confidential or personal, and access should be protected in case the device 10 is lost or stolen during transport or detached from one of the apparatuses 110a,b or c without permission. In accordance with the present invention, access to the portable memory or storage device 10 is prevented when the portable memory or storage device 10 is at a distance more than or equal to a preset range from a specified apparatus such as apparatus 110a or the last authorized apparatus to access device 10.

Figure 2:
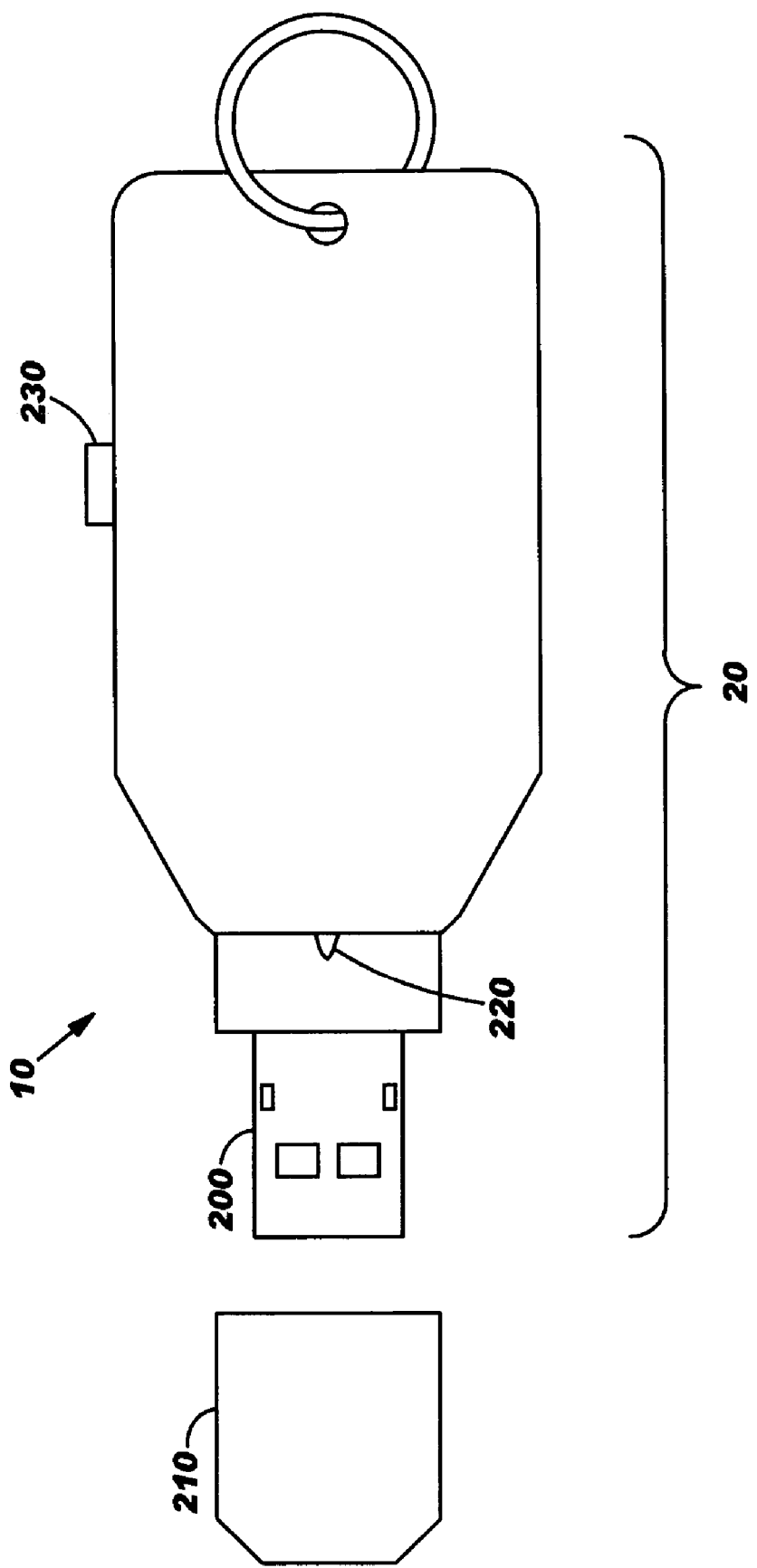
FIG. 2 shows an exemplary structure of the portable memory or storage device of FIG. 1.

FIG. 2 shows an exemplary construction of the portable memory or storage device 10. The portable memory or storage device 10 includes a main unit 20 including a connection interface 200, a protective-cover/removal-detecting switch 220, an input switch 230, and a protective cover 210. The connection interface 200, which may be a USB connector or the like, is an attachment interface for an information processing apparatus 110a,b or c for transmitting and receiving data to and from the information processing apparatus 110a,b or c. The protective cover 210 can cover the connection interface 200 while the portable memory or storage device 10 is not inserted into the information processing apparatus 110a,b or c. The protective cover 210 can be removed from the connection interface 200 to expose the connection interface 200 so that it can be inserted into the information processing apparatus 110a,b or c. (The portable memory or storage device 10 will not fit into the apparatus 110a,b or c with the cover 210 over the connection interface 200.) The protective-cover/removal-detecting switch 220 is depressed when the protective cover 210 covers the connection interface 200 and returns to the original, "out" position when the protective cover 210 is removed. Thus, switch 220 detects whether the protective cover 210 is removed or attached. The input switch 230 is depressed by the user of the portable memory or storage device 10 when inputting an instruction when the user wants to disable the protection capability of the portable memory or storage device 10.

Figure 3:
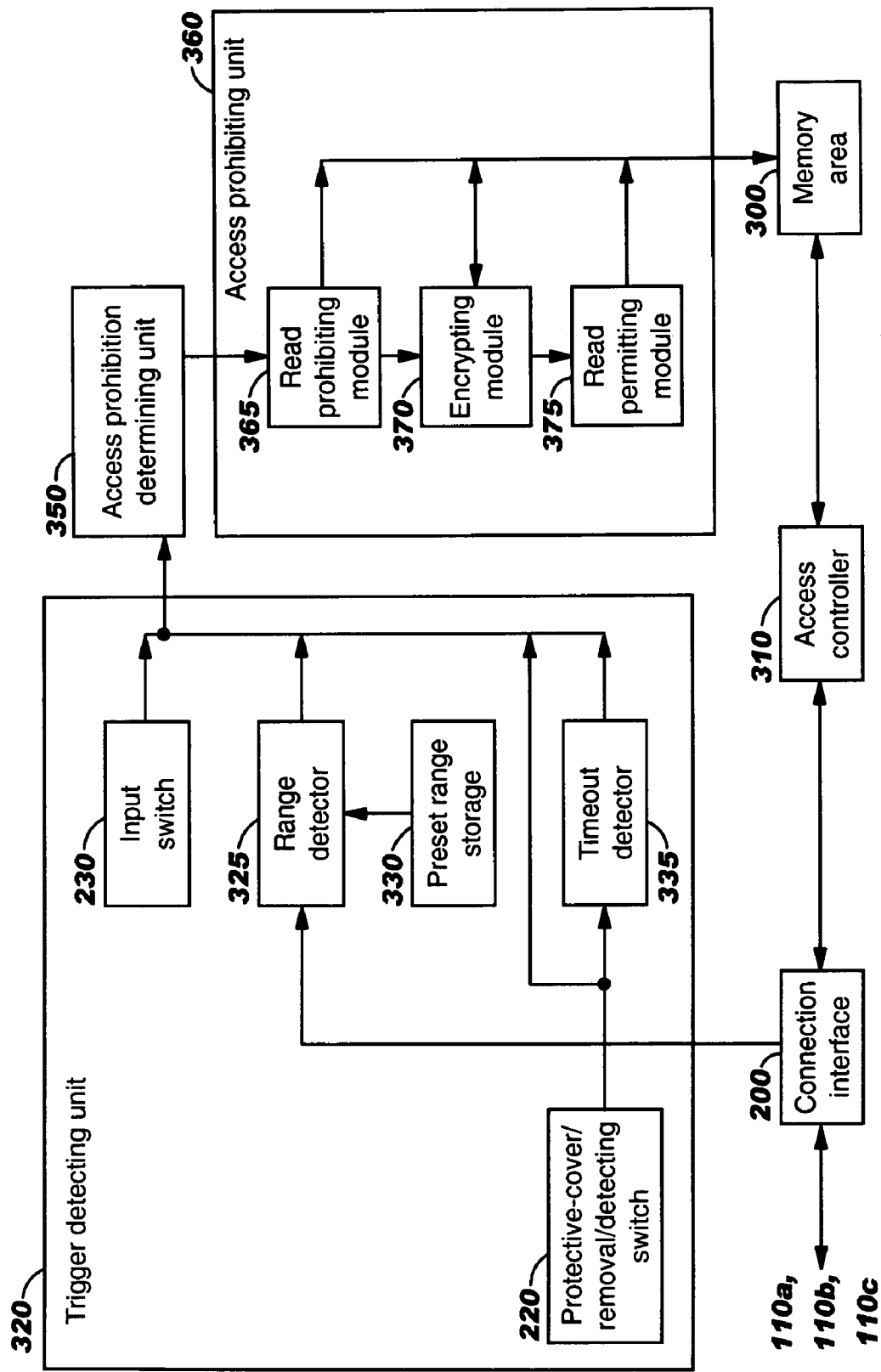
FIG. 3 is a flow diagram of the portable memory or storage device of FIG. 1.

FIG. 3 shows a functional configuration of the portable memory or storage device 10. The portable memory or storage device 10 includes the connection interface 200, a memory or storage area 300, an access controller 310, a trigger detecting unit 320, an access prohibition determining unit 350, and an access prohibiting unit 360. The connection interface 200 is connected to an information processing apparatus 110a,b or c for transmitting and receiving data stored in the portable memory or storage device 10 to and from the information processing apparatus 110a,b or c. The memory or storage area 300 stores data, which may be provided to the portable memory or storage device 10 by the user of the portable memory or storage device 10.

The access controller 310 receives an access request such as a read request for reading data from the memory or storage area 300 and a write request for writing data to the memory or storage area 300 from an information processing apparatus 110a,b or c through the connection interface 200. When receiving an access request, the access controller 310 performs an access operation such as a data write or read to or from the memory or storage area 300 and returns an acknowledgment (in the case of a write) or requested data (in the case or a read) to the information processing apparatus 110a,b or c.

The trigger detecting unit 320 detects a trigger condition for prohibiting access to a portion or all of the data stored in the memory or storage area 300. The trigger detecting unit 320 according to the present embodiment includes, in addition to the protective-cover/removal-detecting switch 220 and the input switch 230 shown in FIG. 2, a range detector 325, a preset range detector 330, and a time-out detector 335. The protective-cover/removal-detecting switch 220 detects whether the protective cover 210 is removed. The input switch 230 inputs a permission instruction from the user to disable access protection by the access prohibition unit 360. The range detector 325 detects whether the portable memory or storage device 10 is beyond a preset range or distance from a reference device. If the device 10 has a wireless communication unit for wireless communication with apparatus 110a,b or c, then the out-of-range condition can be based on whether the device 10 is within wireless communication range of the "home" apparatus 110a,b or c. The range detector can be a non-contact IC tag, RFID, Bluetooth device or any wireless communication device pair for short, preset ranges, and a GPS unit for longer, preset ranges. The predetermined device in the present embodiment can be the desk top information processing apparatus 110a that has accessed the portable memory or storage device 10. Alternately, the reference device may be a mobile information processing apparatus 110b or c, such as a mobile phone, PDA, or wireless IC card, that is carried by the user.

The preset range storage 330 can store different preset ranges associated with a number of information processing apparatuses 110a,b or c used by the user of the portable memory or storage device 10. The preset range storage 330 allows the range detector 325 to use the preset range associated with the respective information processing apparatus 110*a,b* or *c* that has last accessed the portable memory or storage device 10.

The time-out detector 335 detects whether a preset time has elapsed after the protective cover 210 is removed from the connection interface 200. Even if portable memory or storage device 10 is installed in the owner's information processing apparatus for a long time, the time-out will occur. However, a pop-up will appear on the screen which will permit the user to authenticate himself or herself with a valid userID and password or biometric such as a finger print, to temporarily disable the denial of access protection.

The access prohibition determining unit 350 determines whether access to a portion or all of the data in memory or storage area 300 should be prohibited, based on one or more of: an out-of-range condition detected by the range detector 325, a time-out detected by the time-out detector 335, a protective cover 210 removal detected by the protective-cover/removal-detecting switch 220, or a permission instruction input through the input switch 230. The access prohibiting unit 360 prevents access to a potion or all of the data stored in the memory or storage area 300 if the access prohibition determining unit 350 determines that access should be prohibited based on one or more of the foregoing factors. In one embodiment of the present invention, the access prohibition unit 360 includes an encrypting program module 370 to encrypt data stored in the memory or storage area 300 when access should be prevented, such that the data cannot be understood by a third party. In addition to or instead of the foregoing encryption, the access prohibiting unit 360 includes a read prohibiting program module 365 and a read permitting program module 375. The read prohibiting program module 365 prohibits reading of data stored in the memory or storage area 300 when access is prohibited. The read permitting program module 375 permits reading of encrypted data by a user who is allowed to decrypt the data. Once the data is encrypted and easy access is prevented, to gain access and decrypt the data the user must authenticate himself or herself using a valid userID and password or a biometric such as a finger print.

Figure 4:
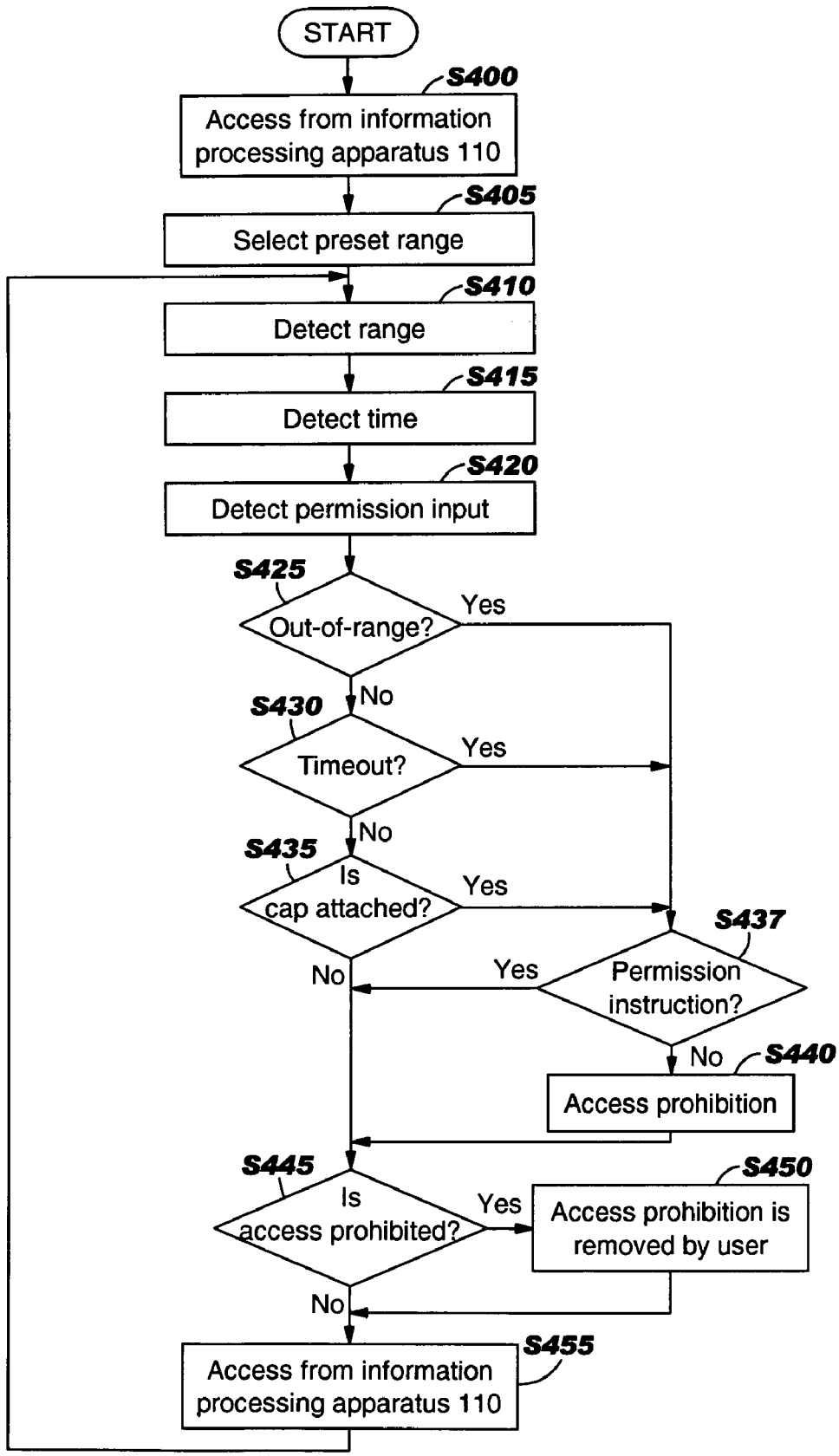
FIG. 4 is a flow chart of programming within the portable memory or storage device of FIG. 1.

FIG. 4 is a flowchart of programming within the portable memory or storage device 10. An example will be described below in which data is moved from information processing apparatus 110*b* to information processing apparatus 110*c*. First, the portable memory or storage device 10 is attached to information processing apparatus 110*b*. Then, the access controller 310 receives an access request from information processing apparatus 110*b* and accesses the memory or storage area 300 (S400). The access controller 310 may first receive a password entered by the user of the portable memory or storage device 10 from information processing apparatus 110*b*, authenticate the user and, if the user is authentic, then permit the user to access to the memory or storage area 300. Alternately, when the access controller 310 receives a request for writing new data into the memory or storage area 300, the access controller 310 may write the new data into the memory or storage area 300 without authenticating the user. Then, the range detector 325 receives information identifying information processing apparatus 110*b* (connected to the portable memory or storage device 10 through the connection interface 200) and, based on the identification information, selects one of a plurality of preset ranges stored in the preset range storage 330 (S405). If the portable memory or storage device 10 is accessed by one of the information processing apparatus 110*a,b* or *c*, and after this access the device 10 is not accessed by another information processing apparatus 110*a,b* or *c*, the range detector 325 reads and uses the preset range associated with the one information processing apparatus 110*a,b* or *c*. The identification information may be a manufacturer's serial number uniquely assigned to each information processing apparatus 110*a,b* or *c*. Alternatively, it may be information that is set to different values according to whether the information processing apparatus 110*a,b* or *c* is portable or not, or whether it is shared by more than one user. Then, the range detector 325 detects whether the portable memory or storage device 10 is out-of range, i.e. at a distance greater than or equal to the preset range from the one information processing apparatus 110*a,b* or *c* that has accessed the portable memory or storage device 10 (S410).

The range detector 325 may have a close-range communication capability to communicate wirelessly with an information processing apparatus 110*a,b* or *c* and thereby access memory or storage device 10. Range detector 325 may determine that the portable memory or storage device 10 is out of a preset range from the information processing apparatus 110*a,b* or *c* if it becomes unable to communicate wirelessly with the information processing apparatus 110*a,b* or *c* or if the strength of the radio wave from the information processing apparatus 110*a,b* or *c* drops below a predetermined value. Thus, the range detector 325 can detect whether the portable memory or storage device 10 is out of range, based on whether the portable memory or storage device 10 has been moved away from information processing apparatus 110*b* beyond the preset range after its removal from information processing apparatus 110*b*. For this purpose, the range detector 325 may use a wireless IC chip, for example, to communicate wirelessly with the information processing apparatus 110*a,b* or *c*. If the portable memory or storage device 10 wirelessly communicates data with the information processing apparatus 110*a,b* or *c*, the preset range used by the range detector 325 may or may not be the same as a range within which they can communicate data. Therefore, there is another technique to base a decision whether to deny access. The time-out detector 335 detects whether a time-out has occurred, that is, a preset time has elapsed after removal of the protective cover 210 from the connection interface 200 (S415). If the user of the portable memory or storage device 10 depresses the input switch 230, the trigger detecting unit 320 provides a permission instruction (S420). Then, the access prohibition determining unit 350 makes a determination based on a condition detected by the trigger detecting unit 320 as to whether access prohibition should be applied to data written from information processing apparatus 110*b* into the memory or storage area 300. In particular, the access prohibition determining unit 350 makes the determination as to whether access should be prohibited, as follows.

(1) Determination Based on Out-of-Range Condition:

If an out-of-range condition is detected by the range detector 325 (S425: YES), the access prohibition determining unit 350 determines that access prohibition should be applied. Thus, if the user drops or leaves the portable memory or storage device 10 behind and carries information processing apparatus 110*b* to another, out-or-range location, the portable memory or storage device 10 can cause the access prohibiting unit 360 to apply access prohibition.

(2) Determination Based on Time-Out:

If the time-out detector 335 detects a time-out (S430: YES), then the access prohibition determining unit 350 determines that access prohibition should be applied. Thus, if the user leaves the portable memory or storage device 10 for a period longer than a preset time while using the portable memory or storage device 10 without the protective cover 210, the portable memory or storage device 10 can detect the time-out and causes the access prohibiting unit 360 to apply access prohibition. If the portable memory or storage device 10 is subsequently installed in an information processing apparatus, a pop-up will appear on the screen which will permit the user to authenticate himself or herself with a valid userID and password or biometric such as a finger print, to temporarily disable the denial of access protection.

(3) Determination based on presence or absence of protective cover 210: When the protective cover 210 is attached to the connection interface 200 (S435: YES), the access prohibition determining unit 350 determines that access prohibition should be applied. Thus, when the user attaches the protective cover 210 after finishing using the portable memory or storage device 10, the portable memory or storage device 10 can detect this and cause the access prohibiting unit 360 to apply access prohibition. If the portable memory or storage device 10 is subsequently installed in an information processing apparatus, a pop-up will appear on the screen which will permit the user to authenticate himself or herself with a valid userID and password or biometric such as a finger print, to temporarily disable the denial of access protection.

(4) Determination Based on Permission Instruction:

Device 10 also allows a permission instruction to be entered by the user after supplying a valid user ID and password. In such a case, the access prohibition determining unit 350 disables access prohibition by the access prohibiting unit 360 regardless of the above-described determination (1), (2), and/or (3) (S437: YES). In such a case, the access prohibiting unit 350 does not apply access prohibition even if an out-of-range condition, a time-out and/or attachment of the protective cover 210, provided that a permission instruction is entered at a time when the portable memory or storage device 10 can transmit and receive data to and from information processing apparatus 110b, that is, while the portable memory or storage device 10 is attached to information processing apparatus 110b. Thus, even if it is determined based on the above described condition (1), (2) or (3) that access should be prohibited, the user of the portable memory or storage device 10 can disable access prohibition. In such a case, the access prohibition determining unit 350 will permit subsequent access from information processing apparatus 110c if the input switch 230 is depressed while the portable memory or storage device 10 is attached to information processing apparatus 110b, and then the portable memory or storage device 10 is attached to information processing apparatus 110c while the input arrangement is held depressed. Alternately, if the user depresses the input switch 230 while the portable memory or storage device 10 is attached to information processing apparatus 110b and then the user releases the input switch 230, the access prohibition determining unit 350 does not cause the access prohibiting unit 360 to apply access prohibition.

Furthermore, if an out-of-range condition or a time-out is detected or the protective cover 210 is attached to the connection interface 200, the access prohibition determining unit 350 determines that access prohibition should be applied, provided that a permission instruction is not input. Alternately, the access prohibition determining unit 350 may determine that access prohibition should be applied, provided that any combination of these conditions are met. For example, access prohibition determining unit 350 may determine that access prohibition should be applied if at least one of an out-of-range condition and a time-out is detected, or if one of these conditions is met and also the protective cover 210 is attached to the connection interface 200.

If the access prohibition determining unit 350 determines that access prohibition should be applied, the access prohibiting unit 360 applies access prevention (S440). In particular, the read prohibiting program module 365 first prohibits reading of data stored in the memory or storage area 300. For example, the read prohibiting program module 365 may delete entries of data the reading of which should be prohibited from a file management table for managing the files in the portable memory or storage device 10 to prevent reading of the data. Furthermore, the read prohibiting program module 365 may prohibit reading of data by moving the data to a protected area which is a memory or storage area 300 that only an authorized user can read. The protected area may be a security area in a USB memory. Then, the encrypting program module 370 encrypts the reading of data which is prohibited by the read prohibiting program module. Then, the read permitting program module 375 permits reading of the encrypted data so that only a user and a recipient of the data who are allowed to decrypt the encrypted data can read the data properly. As a result of the above-described process performed by the read prohibiting program module 365, encrypting program module 370, and read permitting program module 375, access to data by an unintended third party can be prevented.

Alternately, the access prohibiting unit 360 may prevent access to a portion or all of the data stored on the portable memory or storage device 10 by deleting it. In this case, the access prohibiting unit 360 may selectively delete data stored on the portable memory or storage device 10. For example, if the access prohibiting unit 360 determines that the same data stored on the portable memory or storage device 10 is also stored in information processing apparatus 110b that has accessed the portable memory or storage device 10, the access prohibiting unit 360 may delete the data from the portable memory or storage device 10. On the other hand, if the access prohibiting unit 360 determines that the same data is not stored in information processing apparatus 110b, the access prohibiting unit 360 does not delete the data stored in the portable memory or storage device 10. In particular, if data has been copied from information processing apparatus 110b to the portable memory or storage device 10, the access prohibiting program module 360 checks the data at regular intervals to see if the data copied to the portable memory or storage device 10 matches the original data stored in information processing apparatus 110b. If the original data exists in information processing apparatus 110b at the time the portable memory or storage device 10 is removed from information processing apparatus 110b, the access prohibiting unit 360 may delete the data stored on the portable memory or storage device 10. This deletion allows the portable memory or storage device 10 to prevent release of data more adequately compared with encryption.

Furthermore, if the access prohibition determining unit 350 determines that access prohibition should be applied, the access prohibiting unit 360 may first encrypt data and, after the expiration of a predetermined period of time, delete the data from the portable memory or storage device 10. For example, if it is determined that access prohibition should be applied, the access prohibiting unit 360 may encrypt data and, after a lapse of one hour, delete that data.

If it is determined that access prohibition should be applied, the access prohibiting unit 360 may request authentication of access to data stored on the portable memory or storage device 10 so that only an authorized user can access the data. Then, the portable memory or storage device 10 is attached to an information processing apparatus 110a,b or c or a third party's information processing apparatus 110a,b or c and receives a data access request from the information processing apparatus 110a,b or c. If access is not prohibited by the access prohibiting unit 360 (S445: NO) when the access request is received, then the access controller 310 permits access to the file data without requesting decryption of the data or authentication (S455). On the other hand, if access is prohibited by the access prohibiting unit 360 (S445: YES), the access controller 310 prevents access to the data (S455), unless the access prohibition is removed by data decryption by the user of the portable memory or storage device 10 or authentication of the user (S450).

According to the portable memory or storage device 10 described above, data stored on the portable memory or storage device 10 can be protected against third party access while the user of the portable memory or storage device 10 carrying information processing apparatus 110b is out of a preset range from the portable memory or storage device 10. For example, if the range is preset to 5 meters, the user of the portable memory or storage device 10 can attach the portable memory or storage device 10 to information processing apparatus 110b and copy data to the portable memory or storage device 10 in a meeting room or the like and then attach the portable memory or storage device 10 to information processing apparatus 110c of a person on the next or opposite seat to read the data from the portable memory or storage device 10 into information processing apparatus 110c without repeating authentication or the like. If the user left the portable memory or storage device 10 behind in the meeting room, the portable memory or storage device 10 would apply access prohibition to protect the data.

Figure 5:
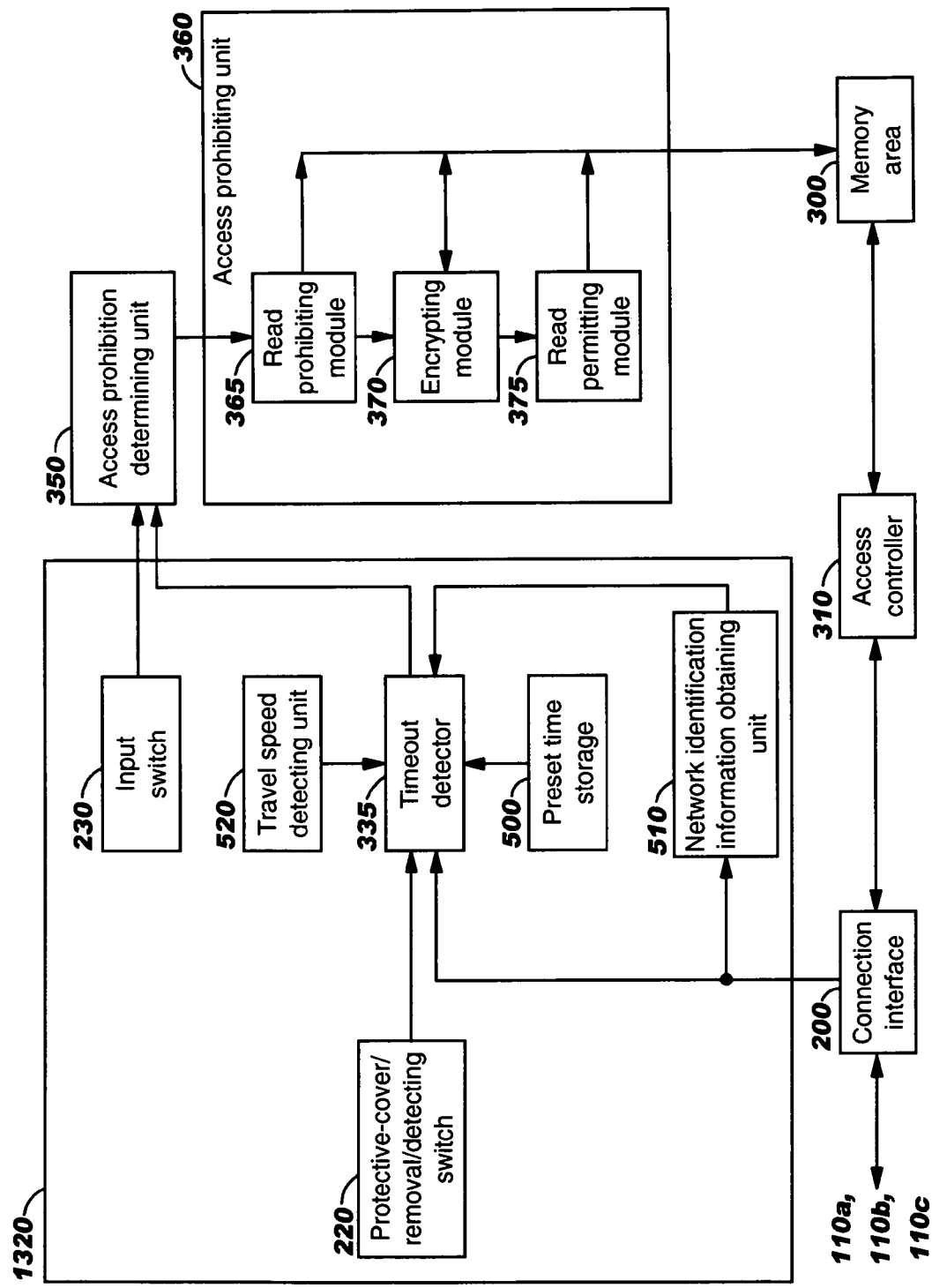
FIG. 5 is a flow diagram of a portable memory or storage device according to another embodiment of the present invention.

FIG. 5 shows a functional configuration of a portable memory or storage device 810 according to another embodiment of the present embodiment. Components of device 810 labeled in FIG. 5 with the same reference numbers as those in the portable memory or storage device 10 shown in FIG. 3 have functions and configurations similar to those in FIG. 3.

The portable memory or storage device 810 includes a connection interface 200, a memory or storage area 300, an access controller 310, a trigger detecting unit 1320, an access prohibition determining unit 350, and access prohibiting unit 360. The trigger detecting unit 320 in this variation has a protective-cover/removal-detecting switch 220, an input switch 230, a time-out detector 335, a preset time storage 500, a network identification information obtaining unit 510, and a travel speed detecting unit 520.

The time-out detector 335 detects whether a first time-out, which occurs when a preset time has elapsed after the portable memory or storage device 810 became unable to communicate with a predetermined device, has occurred. The predetermined device in the present embodiment is the information processing apparatus 110a,b or c that most recently accessed the portable memory or storage device 810. The preset time storage 500 stores different preset times associated with a plurality of information processing apparatuses 110a,b or c and makes them available to the time-out detector 335. The network identification information obtaining unit 510 obtains network identification information identifying a communication network to which the information processing apparatus 110a,b or c, that most recently accessed the portable memory or storage device 810, is connected from the information processing apparatus 110a,b or c through the connection interface 200. The travel speed detecting unit 520 detects the traveling speed of the information processing apparatus 110a,b or c that most recently accessed the portable memory or storage device 810 with respect to the portable memory or storage device 810.

Figure 6:
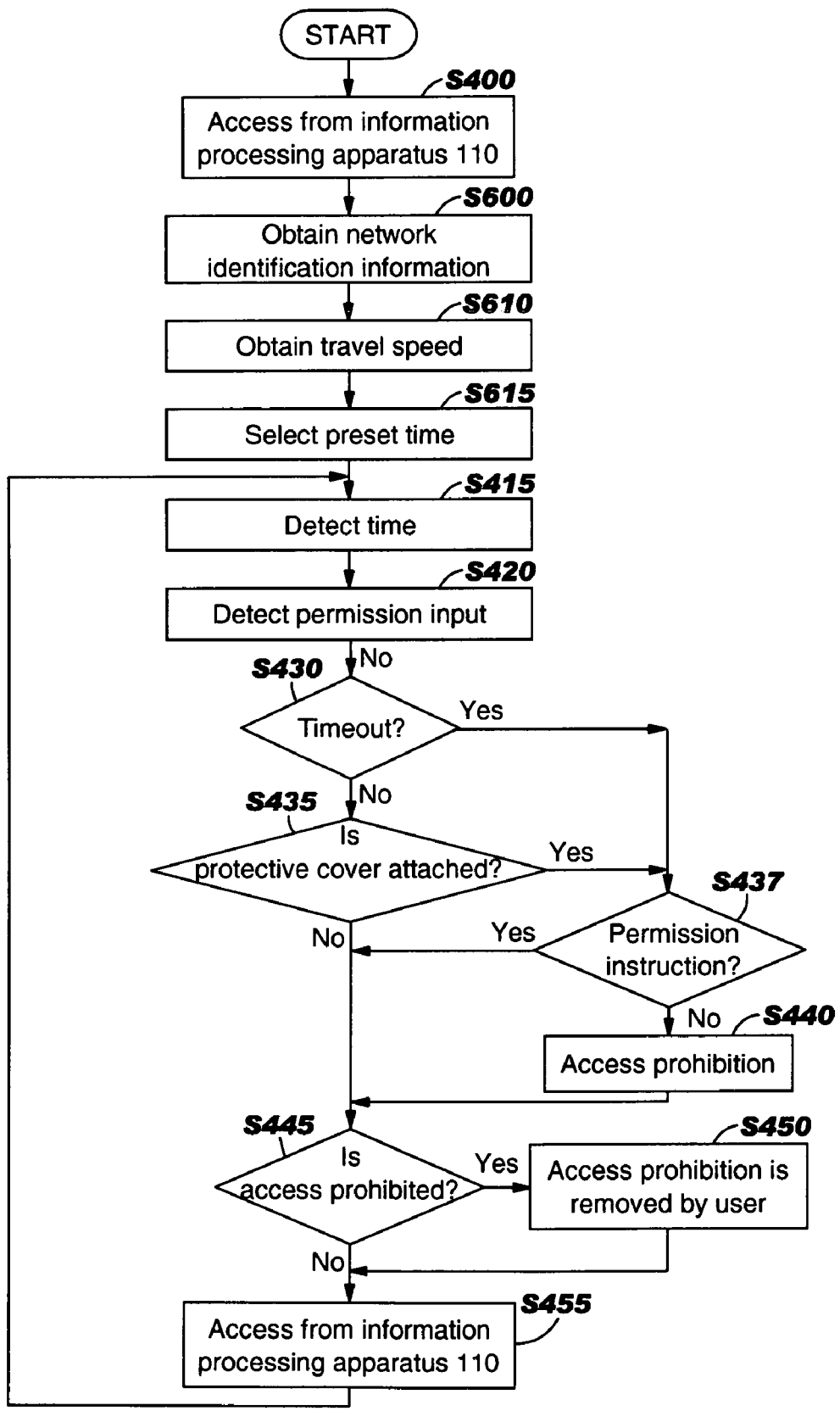
FIG. 6 is a flow chart of programming within the portable memory or storage device of FIG. 5.

FIG. 6 is a flowchart of programming within the portable memory or storage device 810. The steps in FIG. 6 labeled with the same reference numbers as those in the flowchart of FIG. 4 are similar.

First, the portable memory or storage device 10 is attached to information processing apparatus 110b. Then, the access controller 310 receives an access request from information processing apparatus 110b and accesses the memory or storage area 300 (S400). Then the network identification information obtaining unit 510 obtains the network identification information identifying the communication network to which information processing apparatus 110b is connected from information processing apparatus 110b (S600). The network identification information may be information indicating whether the information processing apparatus 110b is connected to a network 100 through cable or by wireless, information identifying the access point to which information processing apparatus 110b is connected, if it is connected to the network 100 by wireless, information identifying the IP address, subnet mask, gateway, and/or DSN server that is set in information processing apparatus 110b, or the name of the network to which information processing apparatus 110b is connected. Then, the travel speed detecting unit 520 detects the travel speed of information processing apparatus 110b with respect to the portable memory or storage device 10 (S610). For example, the travel speed detecting unit 520 may perform close-range wireless communication with information processing apparatus 110b to detect the relative speed with respect to the portable memory or storage device 10 on the basis of the change rate of strength of radio wave per unit time. Then, the time-out detector 335 selects the preset time associated with information processing apparatus 110b from among a plurality of preset times stored in the preset time storage 500 (S615). In this way, if, after being accessed by an information processing apparatus 110a,b or c, the portable memory or storage device 10 has not been accessed by another information apparatus 110a,b or c, the time-out detector 335 selects the stored present time associated with the information processing apparatus 110a,b or c. Then, the time-out detector 335 determines whether a first time-out has occurred, that is, the preset time has elapsed after the last access to the portable memory or storage device 10 by the information processing apparatus 110a,b or c (S415). The time-out detector 335 may determine that the first time-out has occurred if the preset time has elapsed since the portable memory or storage device 10 was removed from information processing apparatus 110b.

The time-out detector 335 also detects whether a second time-out has occurred, which means that a preset time has elapsed since the protective cover 210 was removed from the connecting interface 200. The preset time used for detecting the second time-out may or may not be the same as the preset time used for detecting the first time-out. The time-out detector 335 may set or change the preset time according to the network identification information obtained by the network identification information obtaining unit 510 or the travel speed of information processing apparatus 110b detected by the travel speed detecting unit 520. For example, if information processing apparatus 110b is connected to the intranet of the user's office or the like, the time-out detector 335 may set a longer preset time than in a situation where information processing apparatus 110b is directly connected to the Internet. This can improve the convenience of the portable memory or storage device 10 by increasing the first time-out period when the portable memory or storage device 810 is used at the office. If information processing apparatus 110b is connected to the network 100 through cable, the time-out detector 335 may set a longer time compared with the case where information processing apparatus 110b is connected to the network 100 by wireless. In this way, if it is determined that the portable memory or storage device 810 is being used on the road, the first time-out period can be reduced to adequately protect data. Furthermore, if the travel speed of information processing apparatus 110b is high, the time-out detector 335 may reduce the preset time compared with the case where the travel speed is low. In this way, if it is determined that the user can travel farther, the first time-out period can be reduced to adequately protect data.

It should be noted that the network identification information obtaining unit 510 and/or the travel speed detection unit 520 may be provided in the portable memory or storage device 10 shown in FIG. 3. In that case, the range detector 325 may set the range according to the network identification information and/or the travel speed. Then, the input switch 230 provides a permission instruction (S420).

The access prohibition determining unit 350 then determines whether access to the data written from information processing apparatus 110b to the memory or storage area 300 should be prohibited, based on a condition or conditions detected by the trigger detecting unit 320. In particular, the access prohibition determining unit 350 according to the variation of the present embodiment determines whether or not access prohibition should be applied, as follows.

(1) Determination Based on First and/or Second Time-Out:

If a first and/or second time-out is detected by the time-out detector 335 (S430: YES), then the access prohibition determining unit 350 determines that access prohibition should be applied. Thus, if the portable memory or storage device 10 has not been used within the present time, the portable memory or storage device 10 can detect the first time-out and cause the access prohibiting unit 360 to apply access prohibition. Furthermore, the portable memory or storage device 10 can detect a second time-out and cause the access prohibiting unit 360 to apply access prohibition if a preset time has elapsed after the user left the portable memory or storage device 10 unattended during using the portable memory or storage device 10 without the protective cover 210.

(2) Determination Based on Presence or Absence of Protective Cover 210:

If the protective cover 210 is attached to the connection interface 200 (S435: YES), the access prohibition determining unit 350 determines that access prohibition should be applied.

(3) Determination Based on Permission Instruction:

An implementation may be employed in which the access prohibition determining unit 350 prevents the access prohibiting unit 360 from applying access prohibition if a permission instruction is entered by the user (S437: YES), regardless of the result of determinations (1) or (2) described above. If the access prohibition determining unit 350 determines that access prohibition should be applied, the access prohibiting unit 360 applies access prohibition (S440). Then, the portable memory or storage device 810 is attached to an information processing apparatus 110a,b or c or a third party's information processing apparatus 110a,b or c and receives a data access request from the information processing apparatus 110a,b or c. If access is not prohibited by the access prohibiting unit 360 (S455: NO) when receiving the access request, the access controller 310 permits access to a file without request data decryption or authentication (S455). On the other hand, if access is prohibited by the access prohibiting unit 360 (S445: YES), the access controller 310 does not permit access (S455), unless the access prohibition is removed by data decryption by the user of the portable memory or storage device 810 or authentication of the user (S450).

According to the portable memory or storage device 810 described above, when a preset time has elapsed since a user of the portable memory or storage device 810 used the portable memory or storage device 810, data stored on the portable memory or storage device 10 can be protected against third party access. For example, if the preset time is five minutes and if the user of the portable memory or storage device 810 attaches the portable memory or storage device 810 to information processing apparatus 110b and copies data from information processing apparatus 110b to the portable memory or storage device 810 in a meeting room, the data can be read out to another person's information processing apparatus 110c without repeating authentication, provided that five minutes has not elapsed after the copy. On the other hand, if the user drops or leaves the portable memory or storage device 810 behind, the portable memory or storage device 810 can apply access prohibition five minutes after the last access to protect data.

Figure 7:
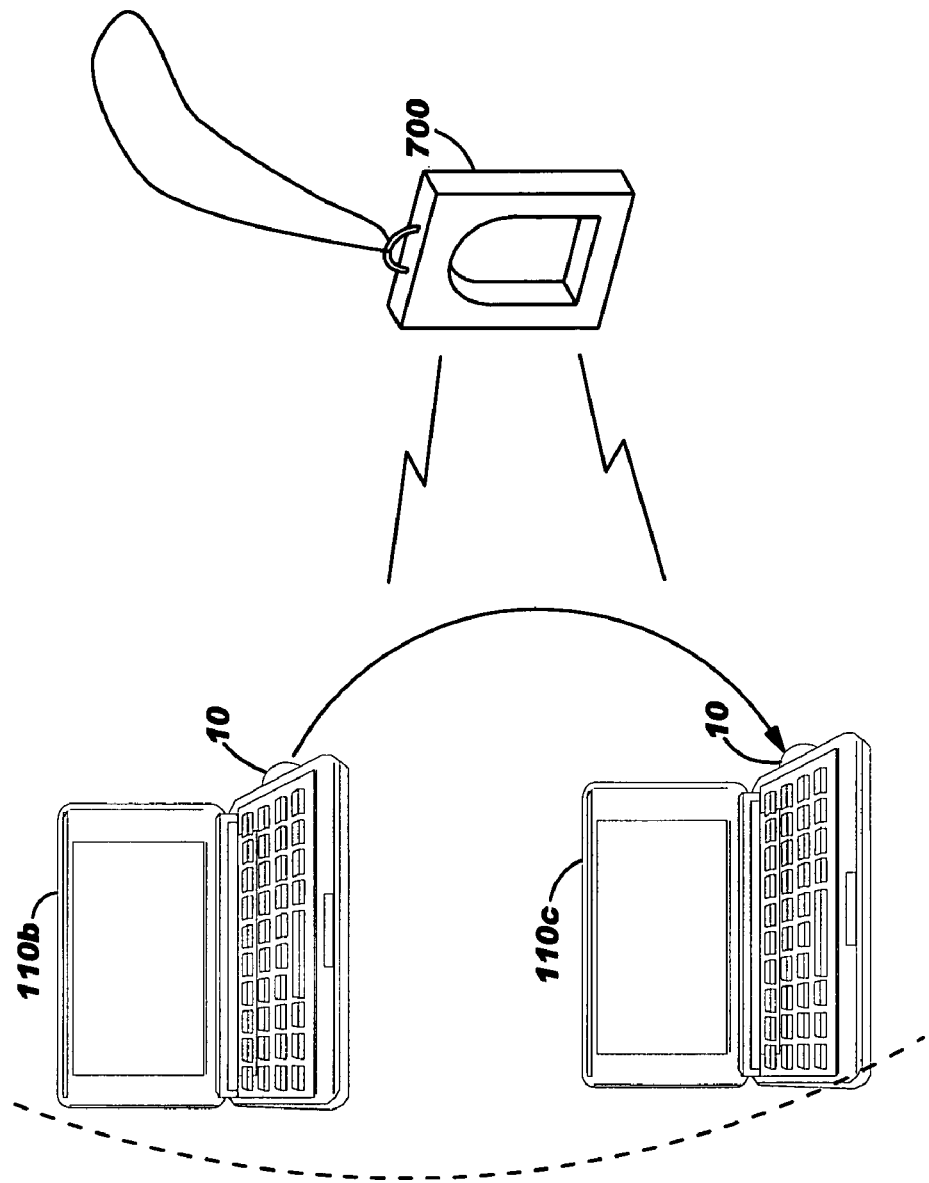
FIG. 7 shows another environment which includes the portable memory or storage devices of FIG. 1 or 5.

FIG. 7 shows another environment which includes portable memory or storage device 10. The portable memory or storage device 10 in FIG. 7 detects an out-of-range condition of the portable memory or storage device 10 from a mobile device 700, instead of an out-of-range condition from an information processing apparatus 110a,b or c as described above. The portable memory or storage device 10 has a configuration and function similar to those of the portable memory or storage device 10 shown in FIG. 3.

The mobile device 700 is carried by a user of the portable memory or storage device 10 and authenticates the user of the portable memory or storage device 10 through finger print recognition, for example. The mobile device 700 has an authentication capability and the capability of communicating with the portable memory or storage device 10. The mobile device 700 may be a device such as a mobile phone, digital camera, digital video camera, PDA, or PC that has additional functions. If the mobile device 700 authenticates a user of the portable memory or storage device 10 properly, it notifies the portable memory or storage device 10 that the user has been authenticated and causes the access controller 310 in the portable memory or storage device 10 to remove access prohibition. Accordingly, the user can access data in the portable memory or storage device 10 through information processing apparatus 110b.

The range detector 325 in the portable memory or storage device 10 detects whether the portable memory or storage device 10 is out of a preset range from the mobile device 700. If an out-of-range condition is detected, the access prohibiting unit 350 in the portable memory or storage device 10 causes the access prohibiting unit 360 to apply access prohibition.

If device 810 substitutes for device 10 in the environment of FIG. 7, a time-out of authentication by a mobile device 700 is detected instead of a time-out of access by an information processing apparatus 110a,b or c. The range detector 325 in the portable memory or storage device 810 detects a time-out, which occurs when a preset time has elapsed after the portable memory or storage device 810 became unable to communicate with the mobile device 700. Consequently the access prohibition determining unit 350 in the portable memory or storage device 810 can prohibit access to data stored on the portable memory or storage device 810 if the time-out is detected.

Figure 8:
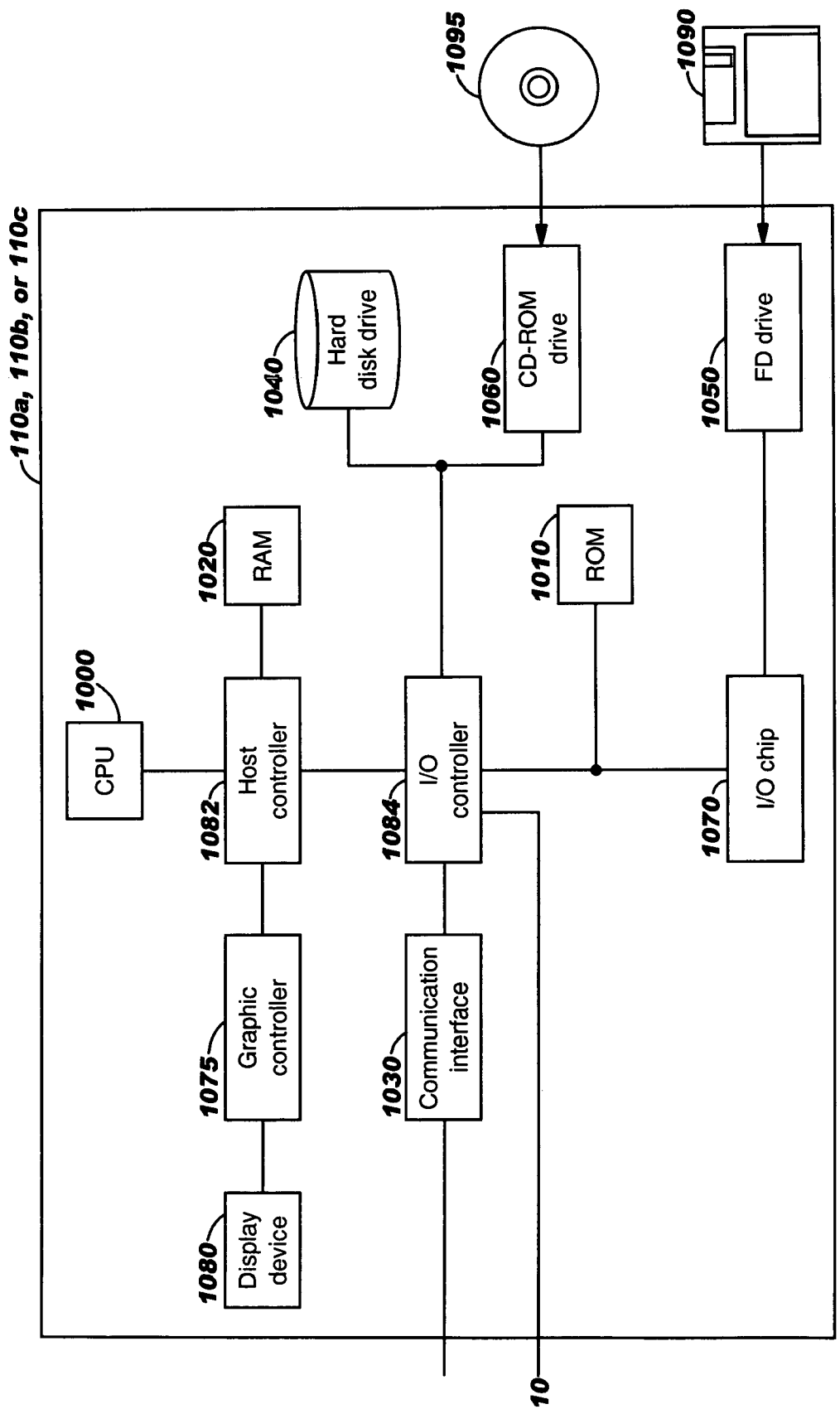
FIG. 8 is a block diagram of a computer which includes the memory or storage device of FIG. 1 or 5.

FIG. 8 shows an exemplary hardware configuration of apparatus 110a,b or c. Each of the apparatus 110a,b, and c includes a CPU program module including a CPU 1000, a RAM 1020, a graphic controller 1075, and a display device 1080 interconnected through a host controller 1082, an input/output program module including a communication interface 1030, a hard disk drive 1040, and a CD-ROM drive 1060 which are connected the host controller 1082 through an input/output controller 1084. Each of the apparatus 110a,b or c also includes a legacy input/output program module including a ROM 1010, a flexible disk drive 1050, and an input/output chip 1070 which are connected to the input/output controller 1084. The host controller 1082 connects the RAM 1020 with the CPU 1000 and the graphics controller 1075 which access the RAM 1020 at higher transfer rates. The CPU 1000 operates according to programs stored in the ROM 1010 and the RAM 1020 to control each component. The graphic controller 1075 obtains image data generated by the CPU 1000 on a frame buffer provided in the RAM 1020 and causes it on the display device 1080. Alternatively, the graphic controller 1075 may contain a frame buffer for storing image data generated by the CPU 1000. The input/output controller 1084 connects the host controller 1082 with the communication interface 1030, the hard disk drive 1040 and CD-ROM drive 1060, which are relatively fast input/output devices. The communication interface 1030 communicates with external devices through a network. The hard disk drive 1040 stores programs and data used by the CPU 1000 in the apparatus 110a,b and c. The CD-ROM drive 1060 reads a program or data from the CD-ROM 1095 and provides it to the hard disk drive 1040 through the RAM 1020.

Connected to the input/output controller 1084 are the ROM 1010 and relatively slow input/output devices such as the flexible disk drive 1050 and the input/output chip 1070. The ROM 1010 stores a boot program executed by the apparatus 110a,b and c during boot-up of the apparatus 110a,b and c and programs which are dependent on the hardware of the apparatus 110a,b and c. The flexible disk drive 1050 reads a program or data from a flexible disk 1090 and provides it to the hard disk drive 1040 through the RAM 1020. Connect to the input/output chip 1070 are a flexible disk 1050 and input/output devices through ports such as a parallel port, serial port, keyboard port, and mouse port, for example. A program to be provided to the hard disk drive 1040 through the RAM 1020 is stored on storage medium such as a flexible disk 1090, a CD-ROM 1095, or an IC card and provided by a user to the hard disk drive 1040. The program is read from the storage medium, installed in the portable memory or storage device 10 connected to the apparatus 110a,b and c through the RAM 1020 and the input/output controller 1084, and executed by a micro controller or the like provided within the portable memory or storage device 10.

The program installed in the portable memory or storage device 10 to cause the portable memory or storage device 10 to perform function according to the present embodiment includes an access processing module, a trigger detecting module having a range detecting module, a preset range managing module and a time detecting module, an access prohibition determining module, and an access prohibiting module having a read prohibiting module, an encrypting module, and read permitting module. The program modules cooperate with the microcomputer or the like in the portable memory or storage device 10 to cause the portable memory or storage device 10 to function as an access controller 310, a trigger detecting unit 320 having a range detecting program module 325, a preset range storage 330, and a time detecting program module 335, an access prohibition determining unit 350, and an access prohibiting unit 360 having a read prohibiting program module 365, an encrypting program module 370, and a read permitting program module 375. The trigger detecting module may have network identification information obtaining module and a travel speed detecting module. The program modules cause the portable memory or storage device 10 to function as a network identification information obtaining unit 510 and a travel speed detecting unit 520.

The programs or modules mentioned above may be stored in an external storage device. Such a storage device may be a flexible disk 1090 or a CD-ROM 1095, or an optical recording medium such as a DVD and CD, a magneto-optical recording medium such as an MO, a tape medium, or a semiconductor memory such as an IC card. Alternatively, a storage such as a hard disk or a RAM provided in a server system connected to a private communication network or the Internet may be used as a storage medium and the program may be provided from the storage to the apparatus 110a,b and c over the network.

While the present invention has been described with respect to specific embodiments, the technical scope of the present invention is not limited to the embodiments described above. Various modifications and improvements can be made to these embodiment without deviating from the scope of the present invention. For example, the portable memory or storage devices 10 and 810 may further include the capability of permitting access through password authentication, in addition to the access prohibition capability described above. For example, the portable memory or storage devices 10 and 810 may permit access to data stored in the portable memory or storage devices 10 or 810 if a password can be authenticated properly while access prohibition is not applied. If access prohibition is applied, the portable memory or storage devices 10 and 810 may prohibit access to the data regardless of the result of password authentication.

The invention claimed is:

1. A storage device that is carried by a user, and that sends and receives data to/from an information processing apparatus, comprising:
   a switch that enters a grant instruction not to conduct an access prevention processing for preventing an access to a portion or all of data recorded in the storage device, by being pressed by the user;
   an access prevention processing unit that conducts the access prevention processing in a case of detecting an isolation state where if the storage device is more than a preset distance from a predetermined instrument or a timeout state where a preset setting time or longer has passed since the storage device can no longer communicate with the predetermined instrument, and that does not conduct the access prevention processing in the case of detecting at least either the isolation state or the timeout state, on condition that a grant instruction is entered under the condition that the storage device can send/receive data to/from the predetermined instrument; and
   an access processing unit that grants the access to the data if the access prevention processing has not been conducted in the case of receiving an access request to the data from the information processing apparatus, and that that does not grant the access to the data if the access prevention processing has been conducted;
   wherein the access prevention processing unit encrypts the data recorded in the storage device, in the case of detecting at least either the isolation state or the timeout state; and wherein the access prevention processing unit comprises:
a reading prevention unit for preventing reading the data in the case of detecting at least either the isolation state or the timeout state;
an encrypting unit for encrypting the data where reading has been prevented; and
a reading permitting unit for granting to read an encrypted data.

2. The storage device according to claim 1, wherein the access prevention processing unit deletes the data recorded in the storage device in the case of detecting at least either the isolation state or the timeout state.

3. A storage device that is carried by a user, and that sends and receives data to/from an information processing apparatus, comprising:
a switch that enters a grant instruction not to conduct an access prevention processing for preventing an access to a portion or all of data recorded in the storage device, by being pressed by the user;
an access prevention processing unit that conducts the access prevention processing in a case of detecting an isolation state where if the storage device is more than a preset distance from a predetermined instrument or a timeout state where a preset setting time or longer has passed since the storage device can no longer communicate with the predetermined instrument, and that does not conduct the access prevention processing in the case of detecting at least either the isolation state or the timeout state, on condition that a grant instruction is entered under the condition that the storage device can send/receive data to/from the predetermined instrument; and
an access processing unit that grants the access to the data if the access prevention processing has not been conducted in the case of receiving an access request to the data from the information processing apparatus, and that that does not grant the access to the data if the access prevention processing has been conducted;
wherein the access prevention processing unit encrypts the data recorded in the storage device, in the case of detecting at least either the isolation state or the timeout state; and
wherein the access prevention processing unit comprises:
a reading prevention unit for moving the data to a protective region, which is a storage region in the storage device, and can be read only by an authorized user, in the case of detecting at least either the isolation state or the timeout state; and
an encrypting unit for encrypting the data moved to the protective region.

4. A storage device that is carried by a user, and that sends and receives data to/from an information processing apparatus, comprising:
a switch that enters a grant instruction not to conduct an access prevention processing for preventing an access to a portion or all of data recorded in the storage device, by being pressed by the user;
an access prevention processing unit that conducts the access prevention processing in a case of detecting an isolation state where if the storage device is more than a preset distance from a predetermined instrument or a timeout state where a preset setting time or longer has passed since the storage device can no longer communicate with the predetermined instrument, and that does not conduct the access prevention processing in the case of detecting at least either the isolation state or the timeout state, on condition that a grant instruction is entered under the condition that the storage device can send/receive data to/from the predetermined instrument; and
an access processing unit that grants the access to the data if the access prevention processing has not been conducted in the case of receiving an access request to the data from the information processing apparatus, and that that does not grant the access to the data if the access prevention processing has been conducted;
a connection interface that is connected to the information processing apparatus, and that sends/receives data to/from the information processing apparatus;
a protective cover that is mounted to the connection interface under the condition where the storage device is not connected to the information processing apparatus, and that is removed from the connection interface in the case of connecting the storage device with the information processing apparatus; and
a time detecting unit for detecting whether or not the storage device has become the timeout state where a preset time period has passed since the protective cover is removed from the connection interface; wherein
the access prevention processing unit conducts the access prevention processing by detecting at least the isolation state or the timeout state by the time detecting unit.

5. The storage device according to claim 4, wherein the access prevention processing unit conducts the access prevention processing by at least detecting the isolation state or the timeout state by the time detecting unit, or, by mounting the protective cover to the connection interface.

6. A storage device that is carried by a user, and that sends and receives data to/from an information processing apparatus, comprising:
a switch that enters a grant instruction not to conduct an access prevention processing for preventing an access to a portion or all of data recorded in the storage device, by being pressed by the user;
an access prevention processing unit that conducts the access prevention processing in a case of detecting an isolation state where if the storage device is more than a preset distance from a predetermined instrument or a timeout state where a preset setting time or longer has passed since the storage device can no longer communicate with the predetermined instrument, and that does not conduct the access prevention processing in the case of detecting at least either the isolation state or the timeout state, on condition that a grant instruction is entered under the condition that the storage device can send/receive data to/from the predetermined instrument; and
an access processing unit that grants the access to the data if the access prevention processing has not been conducted in the case of receiving an access request to the data from the information processing apparatus, and that that does not grant the access to the data if the access prevention processing has been conducted; wherein
the predetermined instrument is a first information processing apparatus accessed to the storage device; and
the access processing unit grants the access to the data in the case that the access prevention processing has not been conducted and does not grant the access to the data in the case that the access prevention processing has been conducted, when an access request to the data is received from the information processing apparatus.

7. The storage device according to claim 6, wherein the storage device is detachable from the information processing apparatus, and is connected to the information processing apparatus and sends/receives data to/from the information processing apparatus; and the storage device further comprises a distance detecting unit for detecting whether or not the storage device becomes the isolation state after the storage device is removed from the first information processing apparatus.

8. The storage device according to claim 6, comprising the access prevention processing unit for deleting data recorded in the storage device if it is determined that the same data as the data is recorded in the first information processing apparatus, and for not deleting data recorded in the storage device if it is determined that the same data as the data is not recorded in the first information processing apparatus, when the isolation state is detected.

9. The storage device according to 6, further comprising a setting distance recording unit for recording the setting distance, which is different from each other according to each of a plurality of first information apparatuses, wherein when the storage device has not been accessed from another first information processing apparatus after being accessed by one of the first information processing apparatus, the storage device further comprises a distance detecting unit for detecting the isolation state if the storage device is more than the preset distance stored in association with one of the first information processing apparatuses from the first information processing apparatus.

10. A storage device that is carried by a user, and that sends and receives data to/from an information processing apparatus, comprising:

a switch that enters a grant instruction not to conduct an access prevention processing for preventing an access to a portion or all of data recorded in the storage device, by being pressed by the user;

an access prevention processing unit that conducts the access prevention processing in a case of detecting an isolation state where if the storage device is more than a preset distance from a predetermined instrument or a timeout state where a preset setting time or longer has passed since the storage device can no longer communicate with the predetermined instrument, and that does not conduct the access prevention processing in the case of detecting at least either the isolation state or the timeout state, on condition that a grant instruction is entered under the condition that the storage device can send/receive data to/from the predetermined instrument; and an access processing unit that grants the access to the data if the access prevention processing has not been conducted in the case of receiving an access request to the data from the information processing apparatus, and that that does not grant the access to the data if the access prevention processing has been conducted; wherein the predetermined instrument is a first information processing apparatus; and the storage device further comprises a time detecting unit for detecting whether or not the storage device becomes the timeout state after the storage device is accessed from the first information processing apparatus at last.

* * * * *